(12) United States Patent
Norman (10) Patent No.: US 7,057,362 B2
(45) Date of Patent: Jun. 6, 2006

(54) OPERATION OF AN ELECTRICAL MACHINE

(75) Inventor: Rosemary Anne Norman, Harrogate (GB)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 10/977,027

(22) Filed: Oct. 29, 2004

(65) Prior Publication Data

US 2005/0099152 A1 May 12, 2005

(30) Foreign Application Priority Data

Nov. 6, 2003 (GB) .................................. 0325955.3

(51) Int. Cl.
*H02P 25/08* (2006.01)
(52) U.S. Cl. ...................... 318/254; 318/439; 318/453; 318/811
(58) Field of Classification Search ................ 318/254, 318/701
See application file for complete search history.

(56) References Cited

U.S. PATENT DOCUMENTS

| | | | | |
|---|---|---|---|---|
| 4,434,389 | A * | 2/1984 | Langley et al. ............. | 318/254 |
| 4,868,478 | A | 9/1989 | Hedlund et al. | |
| 5,467,025 | A * | 11/1995 | Ray ............................ | 324/772 |
| 5,923,141 | A * | 7/1999 | McHugh ..................... | 318/701 |
| 6,051,942 | A * | 4/2000 | French ........................ | 318/254 |
| 6,351,094 | B1 * | 2/2002 | Green ......................... | 318/701 |
| 6,366,865 | B1 * | 4/2002 | Chalupa et al. ............. | 702/65 |
| 6,396,237 | B1 * | 5/2002 | Mayes ........................ | 318/701 |
| 6,448,736 | B1 * | 9/2002 | Lajsner et al. .............. | 318/701 |
| 6,456,031 | B1 * | 9/2002 | Gallegos-Lopez et al. .. | 318/701 |
| 6,472,842 | B1 * | 10/2002 | Ehsani ........................ | 318/701 |
| 6,498,447 | B1 * | 12/2002 | Mann et al. ................. | 318/254 |
| 6,623,245 | B1 * | 9/2003 | Meza et al. ................. | 417/44.1 |
| 6,646,407 | B1 * | 11/2003 | Rahman et al. ............. | 318/701 |
| 6,653,811 | B1 * | 11/2003 | Branecky ..................... | 318/701 |
| 6,674,260 | B1 * | 1/2004 | Harriman et al. ........... | 318/599 |
| 6,586,903 | B1 * | 5/2004 | Moriarty ..................... | 318/701 |
| 6,731,083 | B1 * | 5/2004 | Marcinkiewicz ............ | 318/254 |
| 6,801,012 | B1 * | 10/2004 | Mir et al. .................... | 318/701 |
| 6,853,163 | B1 * | 2/2005 | Slater ......................... | 318/700 |
| 6,897,591 | B1 * | 5/2005 | Peachee et al. ............. | 310/166 |

FOREIGN PATENT DOCUMENTS

| | | |
|---|---|---|
| DE | 30 42 927 A1 | 6/1982 |
| EP | 1 109 309 A2 | 6/2001 |
| WO | WO 91/02401 | 2/1991 |

OTHER PUBLICATIONS

Matsuo, T., et al., "Rotor Position Detection Scheme for Synchronous Reluctance Motor based on Current Measurements," IEEE 1994, pp. 627-634.

(Continued)

*Primary Examiner*—Rina Duda
*Assistant Examiner*—Robert W. Horn
(74) *Attorney, Agent, or Firm*—Dicke, Billig & Czaja, PLLC (57) ABSTRACT

An electrical machine is controlled without using a physical rotor position detector. When the demanded torque output is low, a control method causes the machine to operate on fewer than all the phases, thus increasing the phase current and improving the resolution of the position detection algorithm. The method can include sampling the phase current of the machine, determining whether the phase current is above a predetermined threshold, reducing the number of active phases, and then deriving the value of rotor position from the increased phase current in the remaining phases.

27 Claims, 9 Drawing Sheets

OTHER PUBLICATIONS

Mvungi, N.M., et al., "Accurate Sensorless Rotor Position Detection in a SR Motor," EPE Firenze, vol. 1, 1991, pp. 390-393.

Ray, W.F., et al., "Sensorless Methods for Determining the Rotor Position of Switched Reluctance Motors," EPE Brighton, 1993, vol. 6, pp. 7-13.

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

Search Report for European Patent Application No. 04256902.

* cited by examiner

OPERATION OF AN ELECTRICAL MACHINE

CROSS-REFERENCE TO RELATED APPLICATION

The subject matter of this application is related to the subject matter of British Patent Application No. GB 0325955.3, filed Nov. 6, 2003, priority to which is claimed under 35 U.S.C. § 119 and which is incorporated herein by reference.

BACKGROUND OF THE INVENTION

1. Field of the Invention

This invention relates to the operation of a polyphase electrical machine, particularly, but not exclusively, a polyphase switched reluctance machine.

2. Description of Related Art

Figure 1:
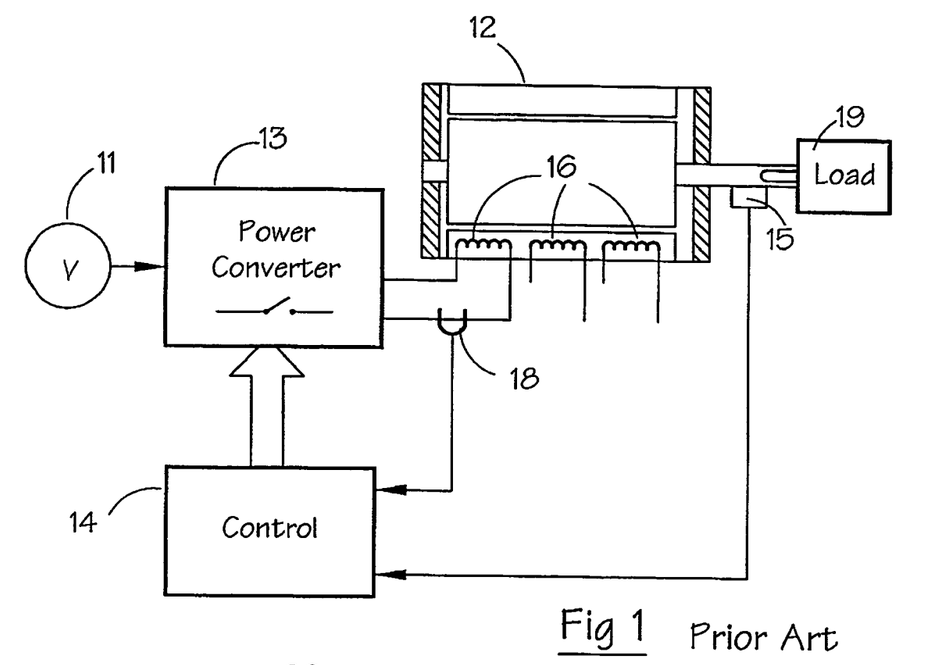
FIG. 1 shows a typical prior art switched reluctance drive.

The characteristics and operation of switched reluctance systems are well known in the art and are described in, for example, "The characteristics, design and application of switched reluctance motors and drives" by Stephenson and Blake, PCIM'93, Nüurnberg, 21–24 Jun. 1993, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

Figure 2:
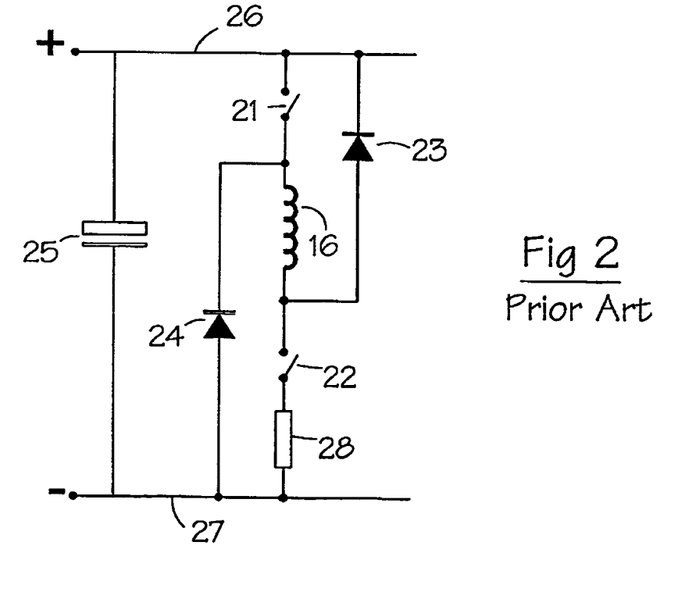
FIG. 2 shows a known topology of one phase of the converter of FIG. 1.

A polyphase system typically uses several "phase legs" of FIG. 2 connected in parallel to energize the phases of the electrical machine. Because switched reluctance machines typically have very low mutual inductances between phases, it is the standard practice in the art to consider firstly the operation of one phase acting alone and simply add contributions corresponding to the other phases, but each time-shifted by an appropriate amount.

Figures 3A, 3B:
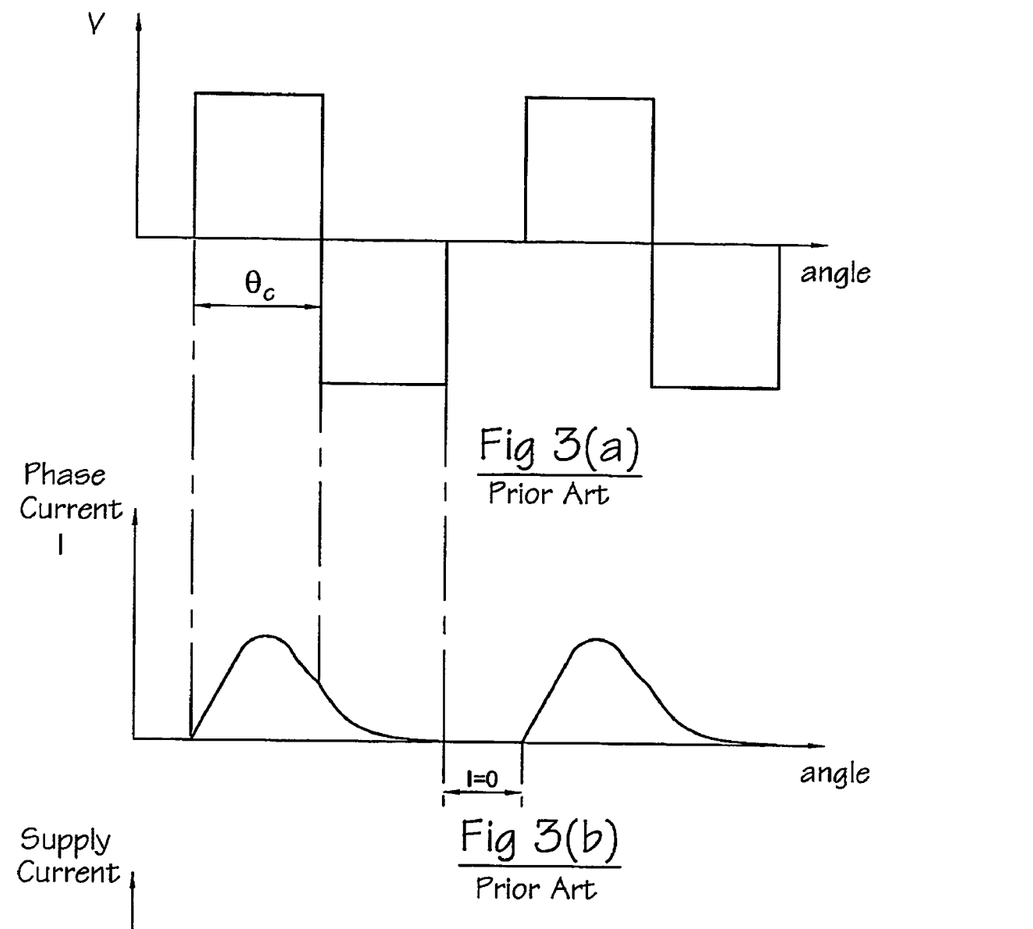
FIG. 3(a) shows a voltage waveform for a switched reluctance machine.
FIG. 3(b) shows a corresponding phase current waveform.
Figure 3C:
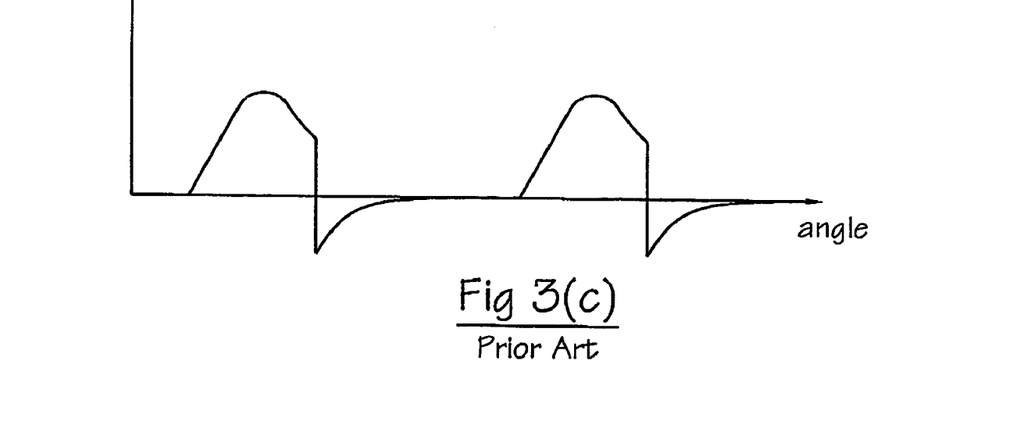
FIG. 3(c) shows a corresponding supply current waveform.

FIGS. 3(a)–(c) show typical waveforms for an operating cycle of the circuit shown in FIG. 2. FIG. 3(a) shows the voltage being applied for the duration of the conduction angle $\theta_c$ when the switches 21 and 22 are closed. FIG. 3(b) shows the current in the phase winding 16 rising to a peak and then falling slightly. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical or magnetic sensor mounted on the stator. A pulse train indicative of rotor position relative to the stator is generated and supplied to control circuitry, allowing accurate phase energization. This system is simple and works well in many applications. However, the rotor position transducer increases the overall cost of assembly, adds extra electrical connections to the machine and is, therefore, a potential source of unreliability.

Various methods for dispensing with the rotor position transducer have been proposed. Several of these are reviewed in "Sensorless Methods for Determining the Rotor Position of Switched Reluctance Motors" by W. F. Ray and I. H. Al-Bahadly, published in the Proceedings of The European Power Electronics Conference, Brighton, UK, 13–16 Sep. 1993, Vol. 6, pp 7–13, incorporated herein by reference.

Figure 4:
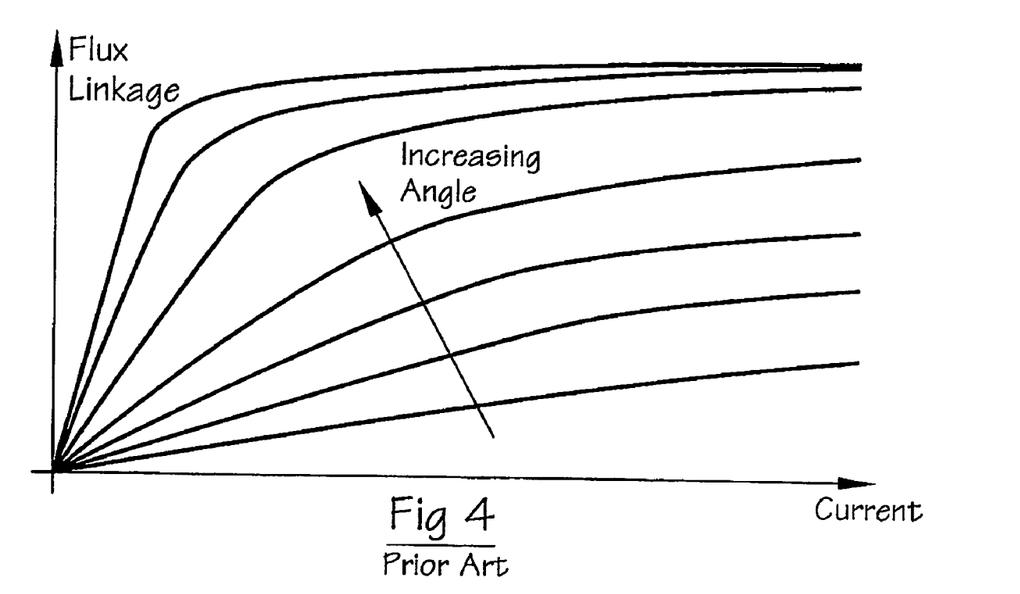
FIG. 4 shows typical flux-linkage and phase current curves, with rotor position as a parameter.

Some of these methods proposed for rotor position estimation in an electrically driven machine use the measurement of one or more machine parameters from which other values can be derived. For example, phase flux-linkage (i.e. the integral of applied voltage with respect to time) and current in one or more phases can be monitored. Position is calculated using knowledge of the variation in inductance of the machine as a function of angle and current. This characteristic can be stored as a flux-linkage/angle/current table and is depicted graphically in FIG. 4. The storage of this data involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 5(a) in which the current and inductance waveforms are shown over a phase inductance period. (Note that the variation of inductance is depicted in idealized form.) These methods usually employ diagnostic energization pulses in non-torque-productive phases (i.e. those phases which are not energized directly from the power supply at a particular moment). A method suited to low-speed operation is that proposed by N. M. Mvungi and J. M. Stephenson in "Accurate Sensorless Rotor Position Detection in an S R Motor", published in Proceedings of the European Power Electronics Conference, Firenze, Italy, 1991, Vol.1, pp 390–393, incorporated herein by reference. These methods work best at relatively low speeds, where the length of time taken up by a diagnostic pulse is small compared to the overall cycle time of an inductance period. As speed rises, the pulse occupies a longer part of the cycle and soon the point is reached where reliable position information is not available.

Figure 5A:
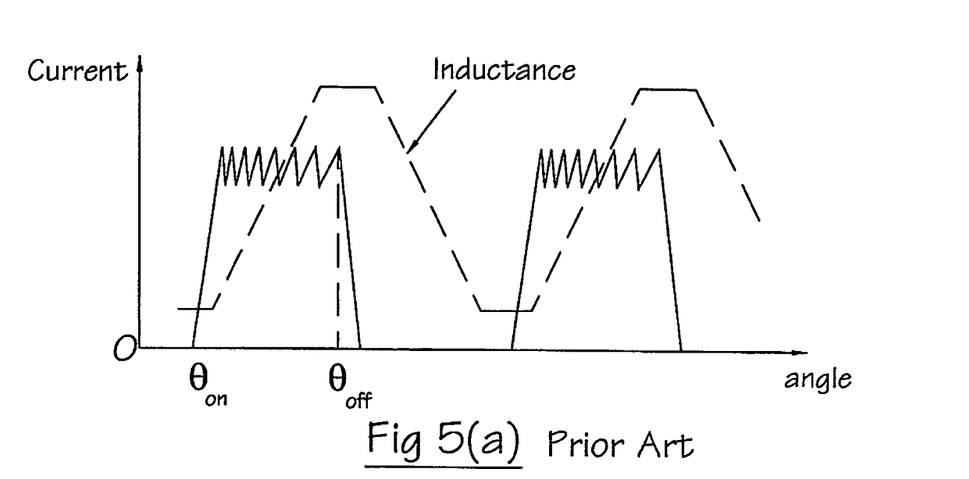
FIG. 5(a) shows a typical motoring current waveform in chopping control.
Figure 5B:
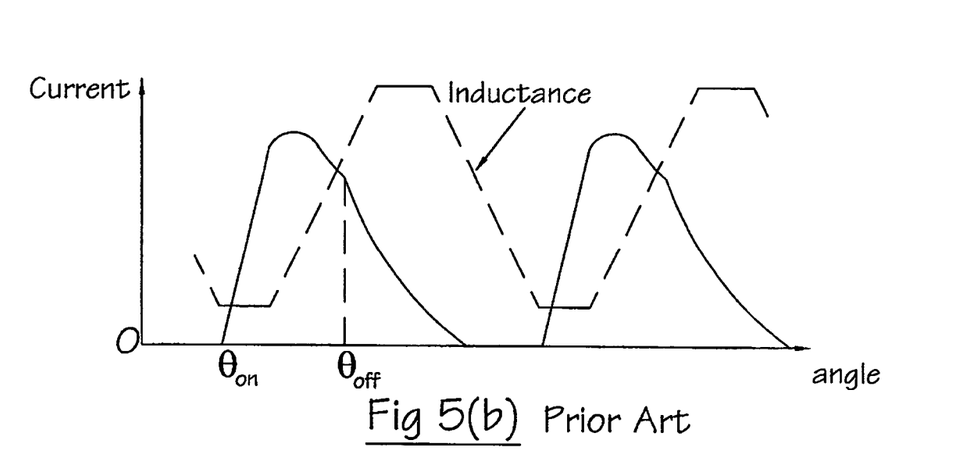
FIG. 5(b) shows a typical motoring current waveform in single-pulse control.

Other methods operate in the "single-pulse" mode of energization at higher speeds. This mode is illustrated in FIG. 5(b) in which the current and inductance waveforms are shown over a phase inductance period. These methods monitor the operating voltages and currents of an active phase without interfering with normal operation. A typical higher speed method is described in International Patent Application WO 91/02401, incorporated herein by reference.

Figure 5C:
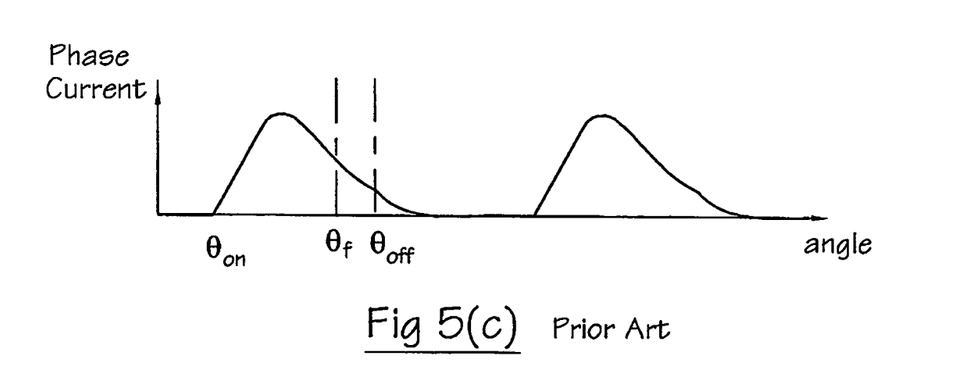
FIG. 5(c) shows a typical motoring current waveform in single-pulse control using freewheeling.

Instead of opening both switches simultaneously, there are circumstances in which it is advantageous to open the second switch an angle $\theta_f$ later than $\theta_{on}$, allowing the current to circulate around the loop formed by the closed switch, the phase winding and a diode. A typical waveform is illustrated in FIG. 5(c). This technique is known as "freewheeling" and is used for various reasons, including peak current limitation and acoustic noise reduction.

The phase inductance cycle of a switched reluctance machine is the period of the variation of inductance for the, or each, phase, for example between maxima when the rotor poles and the relevant respective stator poles are fully aligned. FIG. 5(a) shows the inductance profile in idealized form, whereas in practice the corners of the profile are rounded due to flux fringing in the air and to saturation of the ferromagnetic paths.

It is known that the shape of the phase current waveform of a switched reluctance machine in single-pulse mode is related to the inductance profile of the phase winding. In particular, the start of the rising portion of the inductance profile, which is due to the onset of overlap between the stator and rotor poles, corresponds to the rollover when the phase current changes from rising to falling in the phase inductance cycle. European Patent Application EP 1109309A, incorporated herein by reference, discusses this phenomenon and uses the natural peak in current, in single-pulse operation, as the basis of a rotor position detection method.

In all of these methods, the magnitude of the waveform of the parameter being employed for rotor position detection must be large enough to allow the chosen algorithm to work reliably. While this is not a problem when the machine is on full load or a significant fraction of it, if the machine is called on to operate at a particular speed at no-load or a very small output, the flux or current (for example) is often so small that the position detection algorithms are at best error prone and often completely fail, and the control system consequently loses control of the machine. In many applications this is unacceptable.

SUMMARY OF THE INVENTION

In one form, an embodiment of the invention provides a method of operating a polyphase electrical machine, the method comprising: reducing the duty of at least one phase for a given output demand; and increasing the duty of the other phase(s) to compensate for the reduction in the duty of the at least one phase for the given output demand, in which the variation in the duty of the phases allows, for example, advantageous rotor position detection at low loads.

The duty of the phase is its contribution to the overall output of the machine made up of the plurality of phase outputs. Under ideal normal running conditions, the duty of each phase is equal. This embodiment of the invention varies the duty in at least one of the phases and adjusts the output in the others to compensate. This facilitates robust and cost-effective rotor position detection over a wider range of system loads than previously thought possible.

The duty of the at least one phase is reduced to zero, according to one embodiment.

Method embodiments of the invention may be invoked whenever a threshold of a parameter is reached, or after the threshold has been passed for a predetermined period or for a given number of times within a predetermined period. This addresses the issue of the volatility with which the method is invoked or reverts to a conventional operating technique.

The parameter (e.g. phase current or flux-linkage) can be used to determine the position of a machine rotor relative to its stator in a sensorless rotor position detection technique. Thus, embodiments of the invention, allowing the current fed to the remaining phase(s) to be increased, raise the parameter readings above the threshold at which they are otherwise prone to error.

According to one particular form, the method includes sensing a parameter of the machine; determining when the parameter passes a predetermined threshold; and reducing the duty of the at least one phase in response.

Reduction in the duty of a phase can be introduced gradually as, for example, a set of thresholds in the parameter signal level is each passed. Alternatively, the duty of each phase can be reduced in turn as such a set of thresholds is each passed.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

The illustrative embodiment to be described uses a 3-phase switched reluctance drive in the motoring mode, but any phase number greater than one could be used, with the drive in either motoring or generating mode.

When a balanced, polyphase electrical machine is operating in steady state, all of the phases contribute equally to the output of the machine and the input phase quantities are equal. For example, if the machine is in the motoring mode then the output is mechanical power and the input is balanced phase currents. If the machine is operating in the generating mode, the output is electrical power in the form of balanced phase currents and the input is mechanical power to the rotor. In these cases, the machine is said to share the duty of providing the demanded output equally among the phases.

Figure 6:
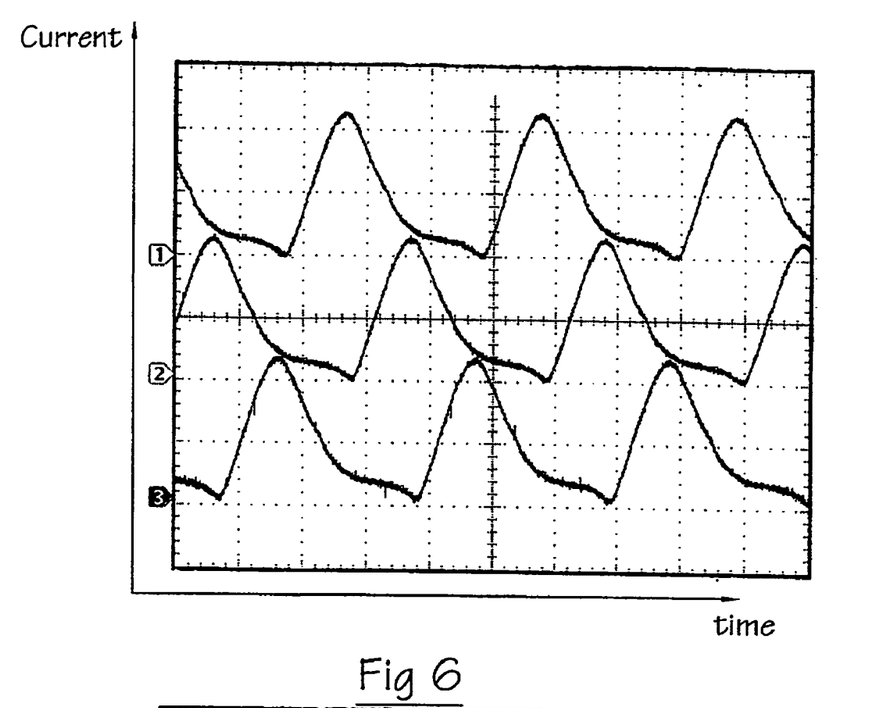
FIG. 6 shows the phase current waveforms of a machine operating at full load.

FIG. 6 shows the measured phase current waveforms of an exemplary 3-phase switched reluctance machine operating near its full load of 22 kW at 4000 rev/min. As would be expected, the currents are balanced. The magnitude of the phase current, approximately 78 A peak, is adequate for the controller to use a position detection routine in a satisfactory way to determine the rotor position.

Figure 7:
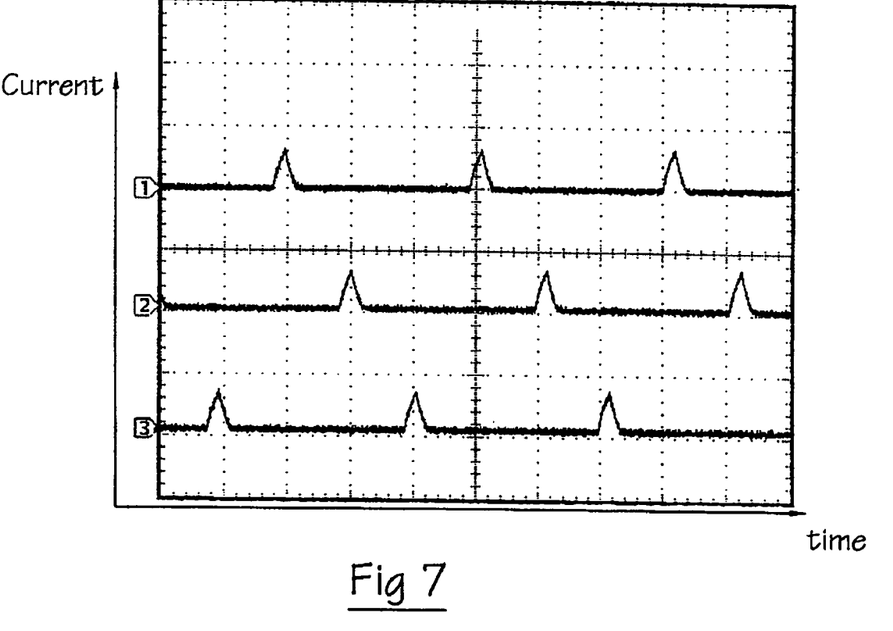
FIG. 7 shows the phase current waveforms of the same machine operating at reduced load.
Figure 8:
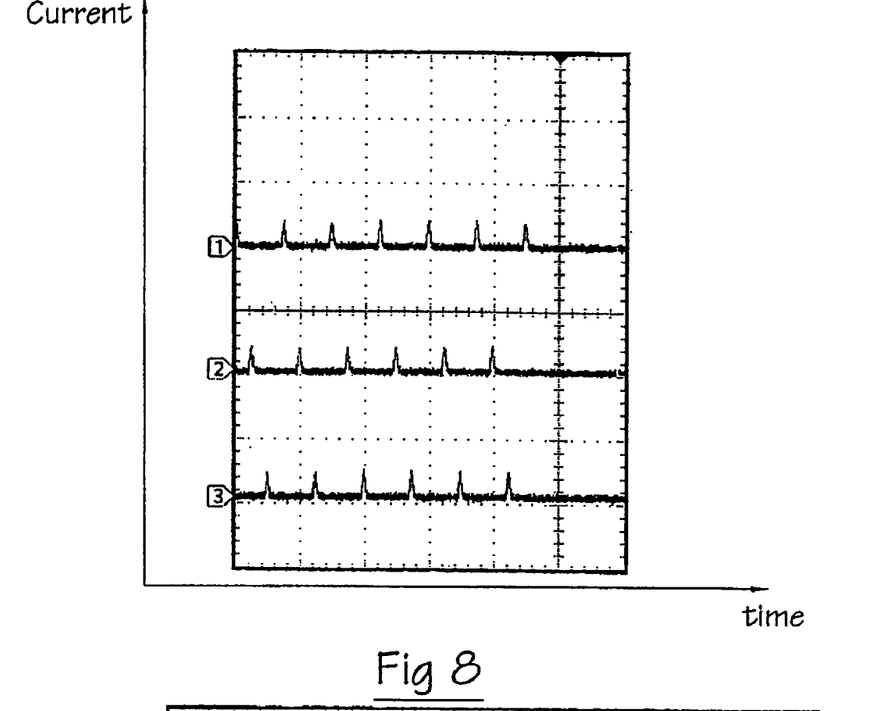
FIG. 8 shows the phase current waveforms of the same machine operating at a yet further reduced load.

FIG. 7 shows the phase current waveforms of the same machine operating at 2% of full load torque with phase currents of approximately 5 A peak. Although the currents are still approximately balanced, relatively small disturbances in the load can cause significant transient unbalance in the currents. The magnitude of the current has now fallen to such an extent that the position detection routines cannot work reliably. FIG. 8 shows the effect of a further very small reduction in demand, which leads to the controller losing control and ceasing to commutate the phases correctly. Although routines are known for recovery from such a condition, there is an inevitable disturbance to the output of the machine, which may be unacceptable to the user.

Figure 9:
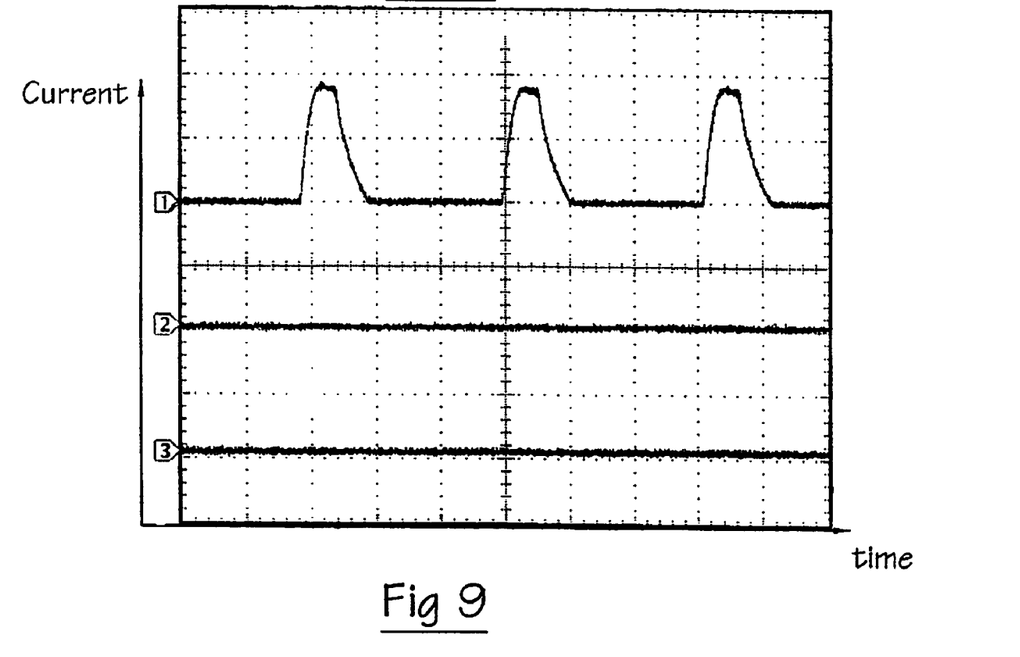
FIG. 9 shows the phase current waveforms of the same machine operated according to an embodiment of the invention.

Embodiments of the invention can be put into effect before this point is reached. The machine is caused to operate on fewer phases than the total number of phases in the machine. For a given load demand, this causes the machine to work much harder in the phases still operating, thus increasing the currents in these phases. In this illustration, the machine is operated on only one of the three phases. FIG. 9 shows the current waveform of that one phase, where the speed and output torque are the same as for FIG. 7. The peak current has gone up from 5 A to 15 A, enabling the position detection algorithm to operate with a much greater safety margin. In this case, the duty is now solely on one of the phases because the duty of the remaining phases is reduced to zero.

This method of operation greatly increases the robustness of the position detection algorithms and enables them to operate successfully over a much wider range of load demand than would otherwise be possible. While the torque ripple will have increased, since only one phase is contributing to the output instead of three, this is preferable to sudden loss of torque if the commutation fails due to the sensorless algorithms losing track of position.

Embodiments of the invention can be implemented in response to a trigger event. This event can be, for example, the load demand falling below a pre-determined level or the phase current falling below a pre-determined level, or some other event which correlates with the position detection algorithms nearing the edge of their stable operating region. In the example described below, a threshold is set for phase current. In other examples of drives, measurement of phase current may not be convenient or possible, so a threshold of load demand, for example, can be used.

Figure 10:
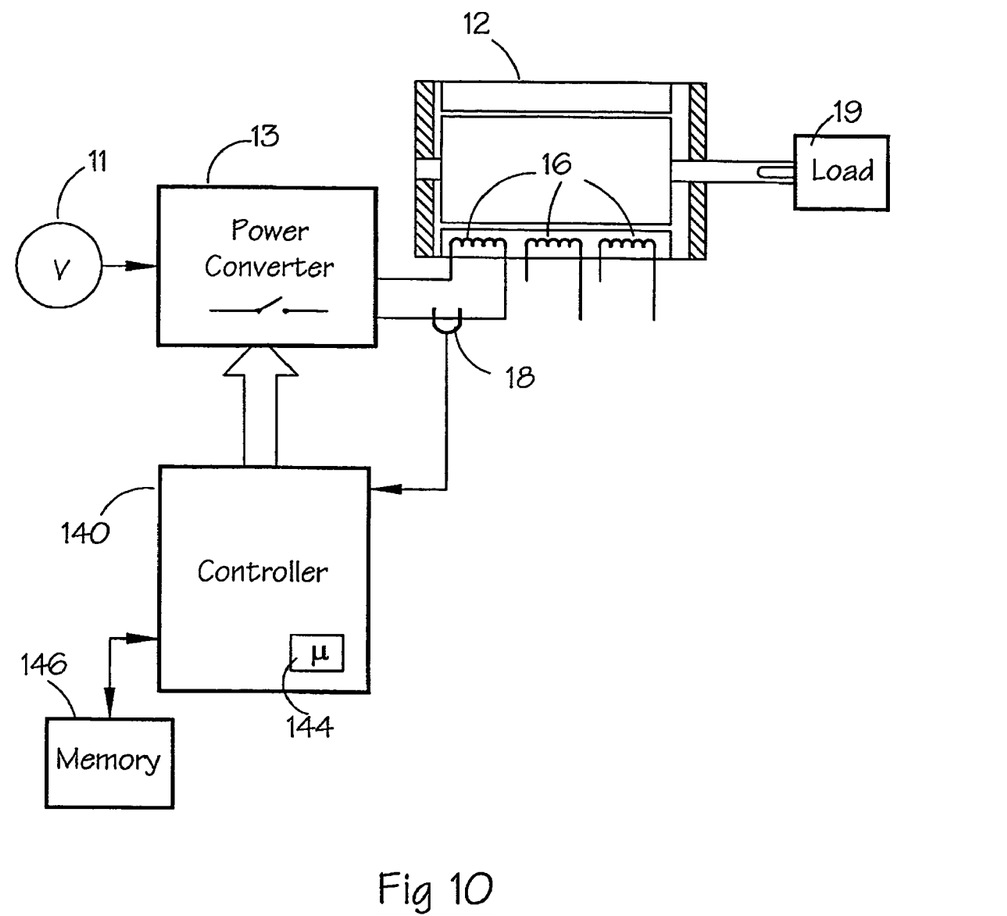
FIG. 10 shows a drive system in which embodiments of the invention may be implemented.

FIG. 10 shows a system for implementing a method in which one form of the invention is embodied. In this, a power converter 13, which is typically the same as that shown in FIG. 1, is provided for controlling the switched reluctance machine. Controlling the converter 13 is a controller 140 which, in this embodiment, incorporates a processor, particularly a digital signal processor 144, e.g. one from the Analog Devices 2181 family, and associated program and data memory 146. Alternative embodiments incorporate a microprocessor or other form of programmable device. The processor runs according to the program code stored in the memory 146 to execute methods according to the present invention.

Figure 11:
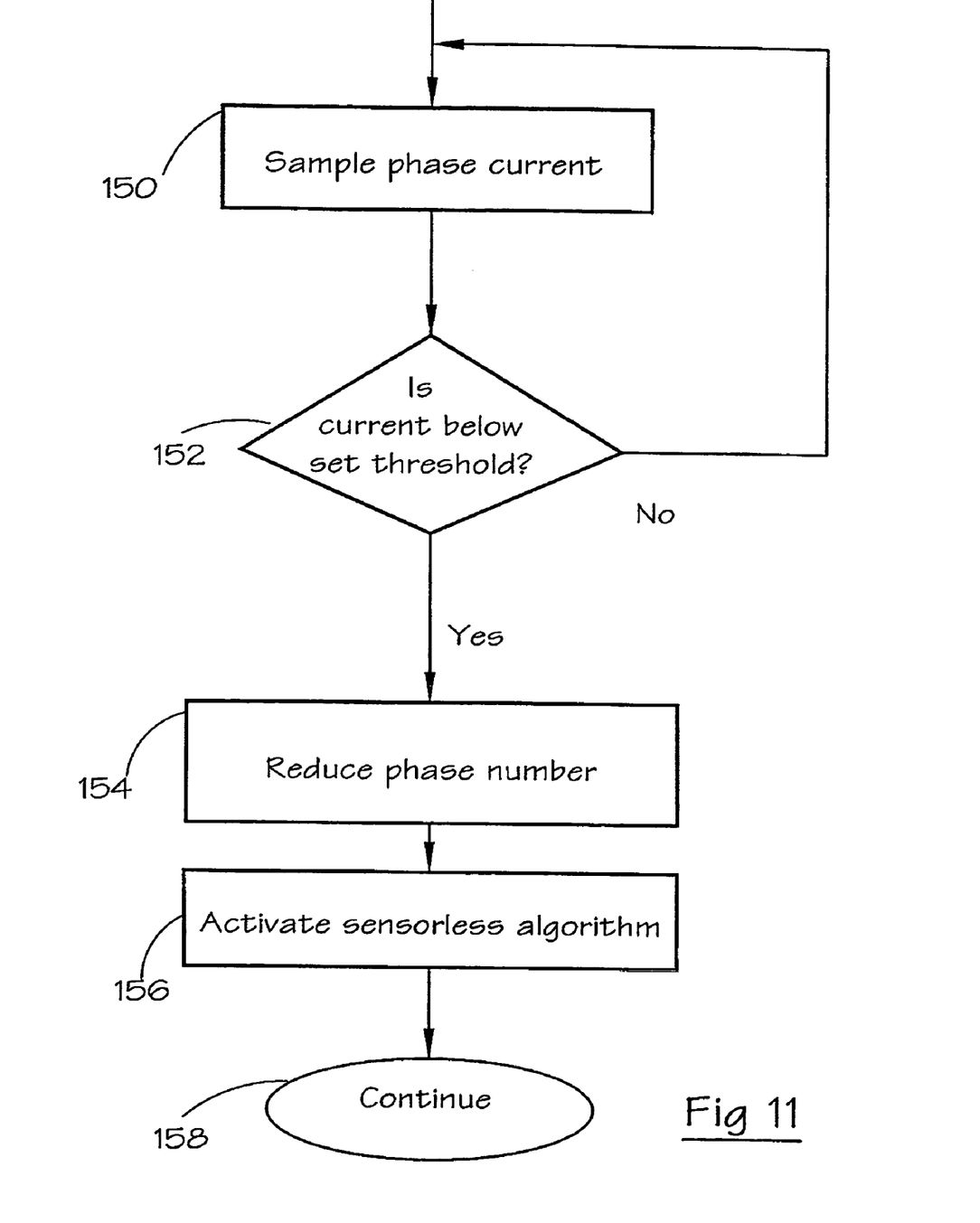
FIG. 11 shows a flowchart for a computer program implementing one embodiment.

FIG. 11 shows a flow chart outlining the method of control which implements an embodiment of the invention in the controller 140. At step 150, the controller samples the phase current e.g. by examining the output from the current transducer 18 (shown in FIG. 1). At step 152, the controller executes a test to check if the peak phase current has fallen below a set threshold. This threshold may be fixed for any drive, or could be a function of speed. If the test is not met, the controller operates as normal, using all the phases. If the test is met, it indicates that the machine should be operated on a reduced number of phases and the active number of phases is then set to the predetermined number. Of course, the reduced number of phases has to include the phase in relation to which the current sensor 18 is arranged. In one form, the number of active phases is reduced to one, giving the maximum increase in the phase quantities in that remaining phase.

In a further development of the basic technique of determining when a threshold has been reached by the phase current, the system requires a succession of current values to be at or below the threshold before machine operation is continued on the reduced number of phases. This avoids an inappropriate change in control strategy in the event of a spurious reading. Similarly, an assessment of the phase current over a given period after the threshold has been reached could be used to the same end in order to avoid a control regime change that is unacceptably volatile.

Figure 12:
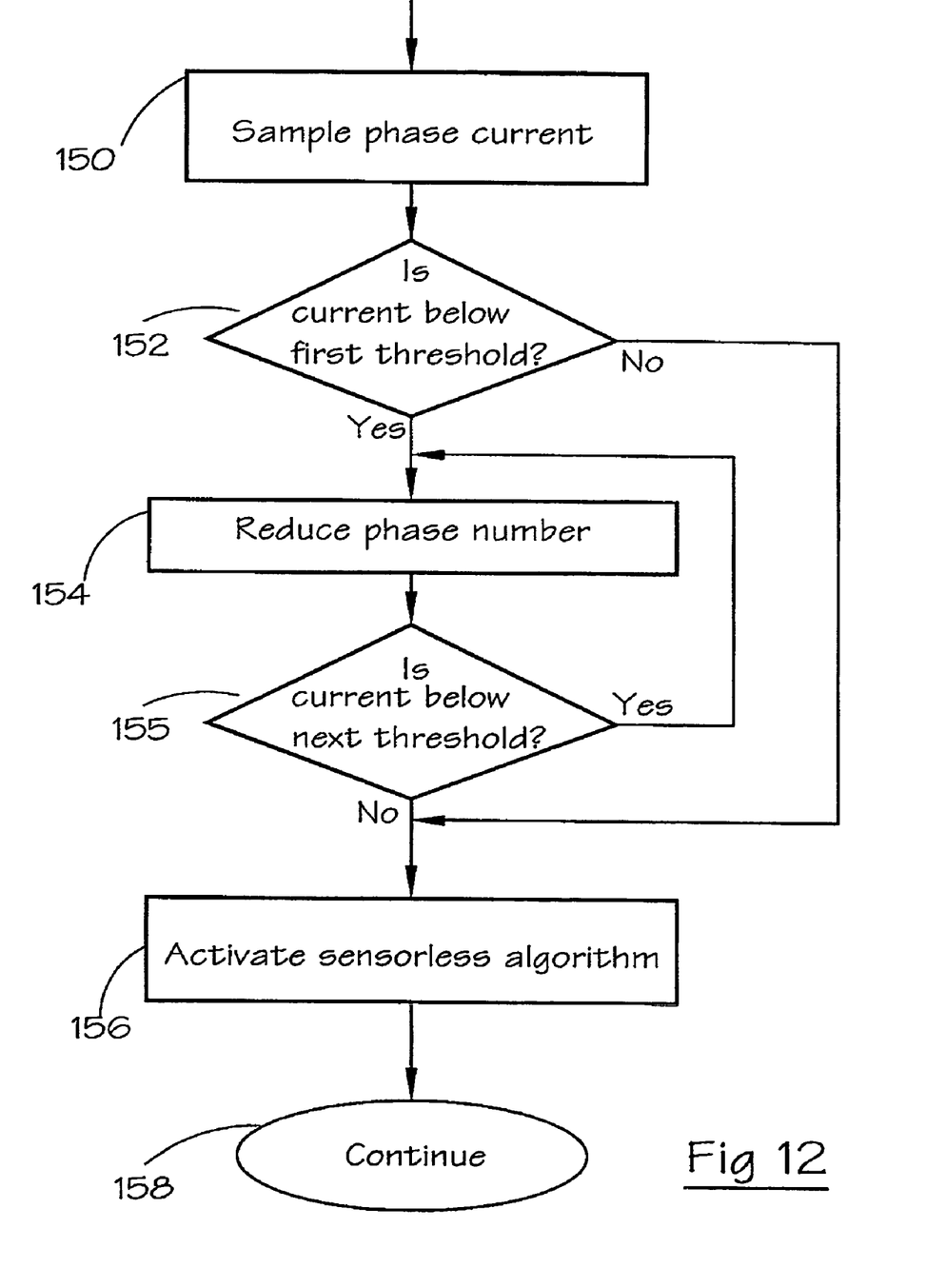
FIG. 12 shows another flowchart for a computer program implementing a further embodiment.

A more sophisticated arrangement, shown in schematic form in FIG. 12, is to successively reduce the number of operating phases, thus keeping the maximum number operating for any load. As the load is further reduced and the current again falls to the threshold, the number of operating phases is again reduced. So, for example, a 4-phase system could operate on 3, 2 and 1 phases as the load is gradually reduced. In this case, a set of thresholds are established at which a decision on removing or reintroducing a phase can be taken. Again, the volatility of removing and reintroducing phases when a current is at or about a given threshold can be addressed by only taking action if the current falls below a threshold for a given period or a number of times in a given period.

In FIG. 12, a further test is implemented at 155 to determine if the current has fallen below the next threshold in a set of thresholds. If that test is met, control loops back to 154 where the phase number is further reduced, if that is possible.

When the number of operating phases has been determined, control passes to step 156 as before and the chosen sensorless algorithm is implemented to determine rotor position and the control continues at step 158 in the usual fashion.

The routine of FIG. 11 or 12 can be executed on each electrical cycle, or on a periodic basis, whichever is appropriate to the specification for the drive.

The illustrated machine has three phases, but one skilled in the art will realize that a machine with different phase numbers or pole combinations could be used, since the invention is not specific to any particular machine topology. For example, a four-phase machine with 8 stator poles and 6 rotor poles could be operated on one phase, say Phase A, or on two phases, say Phases A and B, or Phases A and C. The latter would have the advantage of providing smoother torque output.

Method embodiments and other embodiments may be applied with equal benefit to machines operating as motors or as generators and to any machine where phase-related parameters are used for rotor position detection. Such embodiments are not specific to one genre of position control algorithms.

The skilled person will appreciate that variations of the disclosed arrangements are possible without departing from the invention, particularly in the details of the implementation of the algorithms in the controller. It will also be apparent that, while the technique has been described in relation to a switched reluctance machine, it can be used in relation to any machine with independently supplied phases.

Furthermore, the duty of each phase is described here as being either a full contributor to the machine output (electrical or mechanical) or removed from operation completely. In some situations and/or types of machines it may be advantageous to relieve a phase of only some of its duty to increase the value of parameter used for rotor position detection from the remaining phase(s), but to avoid completely de-energizing the nominated phase(s). Thus, reducing the duty in the other phases only partially and compensating for that reduction in duty in the remaining phase(s) to which the parameter sensor is connected, may sufficiently increase the signal available for sensing.

Also, while the invention has been described in terms of a rotating machine the invention is equally applicable to a linear machine having a stator in the form of a track and a moving part moving on it. The word "rotor" is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the control method without significant changes to the operation described above.

What is claimed is:

1. A method of operating a polyphase electrical machine, the method comprising:
   deriving a value of rotor position from a parameter of the machine;
   reducing the duty of at least one phase for a given output demand; and
   increasing the duty of the other phase(s) to compensate for the reduction in the duty of the at least one phase for the given output demand, thereby altering the value of the parameter used for rotor position detection.

2. A method as claimed in claim 1 in which the said other phase(s) is a single phase.

3. A method as claimed in claim 1 in which the duty is reduced to zero in the at least one phase.

4. A method as claimed in claim 1 including:
   determining when the parameter passes a predetermined threshold; and
   reducing the duty of the at least one phase in response to the parameter passing the predetermined threshold.

5. A method as claimed in claim 4, including:
   determining when the parameter passes each of a plurality of thresholds; and
   sequentially increasing the duty of the other phase(s) as each threshold is passed.

6. A method as claimed in claim 4, including:
   determining when the parameter passes each of a plurality of thresholds; and
   reducing the duty of increasing numbers of phases to zero as each threshold is passed.

7. A method as claimed in claim 4 in which the duty of the at least one phase is reduced when the parameter passes the threshold for a predetermined period.

8. A method as claimed in claim 4 in which the duty of the at least one phase is reduced when the parameter passes the threshold a predetermined number of times in a predetermined period.

9. A method as claimed in claim 1 in which the parameter is phase current.

10. A method as claimed in claim 9 in which the parameter is a peak value of phase current.

11. A method as claimed in claim 1 in which the parameter is phase flux linkage.

12. A method as claimed in claim 1 in which the machine is a switched reluctance machine operating as a generator or a motor.

13. A system for operating a polyphase electrical machine comprising:
   switch means for controlling energization for each of the phases;
   means for deriving a value of rotor position from a parameter of the machine; and
   control means, operably coupled to the switch means, for controlling the duty of each of the phases contributing to output of the machine, the control means being operable to reduce the duty of at least one phase for a given output demand, and to increase the duty of the other phase(s) to compensate for the reduction in the duty of the at least one phase for the given output demand and to alter the value of the parameter from which rotor position is derived.

14. A system as claimed in claim 13 in which the control means is operable to increase the duty of a single other phase.

15. A system as claimed in claim 13 which the control means is operable to reduce the said duty of the at least one phase to zero.

16. A system as claimed in claim 13 including means for sensing a parameter of the machine, the control means being responsive to the sensed parameter to reduce the duty of the at least one phase when the parameter passes a predetermined threshold.

17. A system as claimed in claim 16 including:
   means for determining when the parameter passes each of a plurality of thresholds, the control means being operable to reduce the duty of increasing numbers of phases to zero as each threshold is passed.

18. A system as claimed in claim 16 including:
   means for determining when the parameter passes each of a plurality of thresholds, the control means being operable sequentially to reduce the duty of the at least one phase as each threshold is passed.

19. A system as claimed in claim 16 in which the control means is operable to reduce the duty of the at least one phase in response to the parameter passing the said threshold for a predetermined period.

20. A system as claimed in claim 13 in which the electrical machine is a switched reluctance machine operating as a generator or a motor.

21. A system as claimed in claim 16 in which the parameter is current.

22. A system as claimed in claim 21 in which the parameter is a peak value of phase current.

23. A system as claimed in claim 13 in which the parameter is phase flux linkage.

24. A system for operating a polyphase electrical machine comprising:
   at least one switch adapted to control energization for each of the phases; and
   a controller operably coupled with the at least one switch, the controller being adapted to obtain a value of rotor position from a parameter of the machine, the controller further being adapted to control the duty of each of the phases contributing to output of the machine, to reduce the duty of at least one phase for a given output demand, and to increase the duty of the other phase(s) to compensate for the reduction in the duty of the at least one phase for the given output demand and to alter the parameter of the machine from which the value of rotor position is obtained.

25. The system of claim 24, further comprising a sensor adapted to sense a parameter of the machine, the controller being responsive to the sensed parameter to reduce the duty of the at least one phase when the parameter passes a predetermined threshold.

26. The system of claim 25, wherein the sensed parameter is current.

27. The system of claim 26, wherein the sensed parameter is a peak value of phase current.

* * * * *